(12) United States Patent
Tatebayashi et al.

(10) Patent No.: US 7,973,534 B2
(45) Date of Patent: Jul. 5, 2011

(54) PROTECTION DEVICE FOR ASSEMBLED BATTERY, AND BATTERY PACK UNIT

(75) Inventors: Yoshinao Tatebayashi, Yokohama (JP); Yasuhiro Harada, Yokohama (JP); Norio Takami, Yokohama (JP); Nobuo Shibuya, Hiratsuka (JP)

(73) Assignee: Kabushiki Kaisha Tohshiba, Tokyo (JP)

( * ) Notice: Subject to any disclaimer, the term of this patent is extended or adjusted under 35 U.S.C. 154(b) by 623 days.

(21) Appl. No.: 12/049,688

(22) Filed: Mar. 17, 2008

(65) Prior Publication Data

US 2008/0239628 A1 Oct. 2, 2008

(30) Foreign Application Priority Data

Mar. 28, 2007 (JP) ................................. 2007-086020

(51) Int. Cl.
*G01N 27/416* (2006.01)
*H02J 7/00* (2006.01)
(52) U.S. Cl. ........ 324/433; 320/116; 320/118; 320/128; 320/137
(58) Field of Classification Search .................. 324/433; 320/132
See application file for complete search history.

(56) References Cited

U.S. PATENT DOCUMENTS

| 7,696,725 | B2 * | 4/2010 | Liu et al. ........................ | 320/136 |
| 2006/0261677 | A1 * | 11/2006 | Shibuya et al. ................ | 307/105 |
| 2007/0046260 | A1 | 3/2007 | Ishikawa | |
| 2007/0273332 | A1 * | 11/2007 | Funabashi et al. ............ | 320/134 |

FOREIGN PATENT DOCUMENTS

| CN | 1880967 A | 12/2006 |
| FR | 2 862 813 | 5/2005 |
| JP | 2001-314046 | 11/2001 |
| JP | 2002-238179 | 8/2002 |
| JP | 2005-328642 | 11/2005 |
| JP | 2006-322715 | 11/2006 |
| JP | 2007-6552 | 1/2007 |
| WO | WO 2006/068430 A1 | 6/2006 |

OTHER PUBLICATIONS

Chinese Office Action issued Mar. 1, 2010, in Patent Application No. 200810087492.7 (with English-language translation).

* cited by examiner

*Primary Examiner* — Edward Tso
*Assistant Examiner* — Ahmed Omar
(74) *Attorney, Agent, or Firm* — Oblon, Spivak, McClelland, Maier & Neustadt, L.L.P.

(57) ABSTRACT

A protection device for an assembled battery includes a sampling unit which individually samples voltages of batteries of the assembled battery to generate sampled voltages, a holding unit which holds the sampled voltages to generate a plurality of holding voltages, a multiplexer which sequentially reads the holding voltages and outputs each voltage to a common output node, a measuring unit configured to measure the individual voltages and the state of charges of the batteries based on a voltage of the node in a measuring period within a constant measuring cycle, and a control unit configured to turn on/off the sample switches at the same time within the measuring period and repeatedly turn on/off at least one sample switch selected from the plurality of sample switches in accordance with the state of charge in a term other than the measuring period.

12 Claims, 6 Drawing Sheets

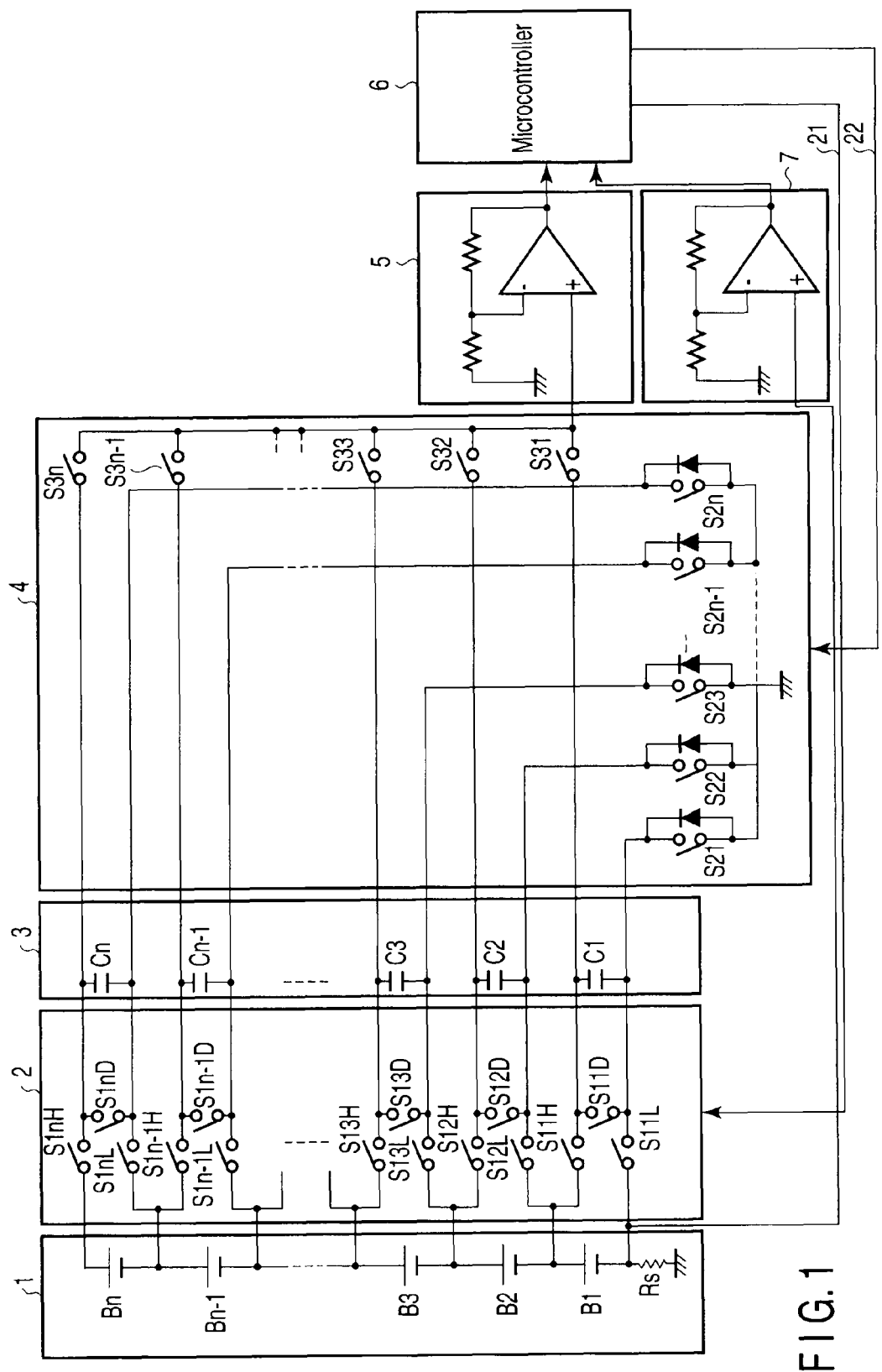
F I G. 1

PROTECTION DEVICE FOR ASSEMBLED BATTERY, AND BATTERY PACK UNIT

CROSS-REFERENCE TO RELATED APPLICATIONS

This application is based upon and claims the benefit of priority from prior Japanese Patent Application No. 2007-086020, filed Mar. 28, 2007, the entire contents of which are incorporated herein by reference.

BACKGROUND OF THE INVENTION

1. Field of the Invention

The present invention relates to a protection device for protecting an assembled battery including a plurality of secondary batteries connected in series, and a battery pack unit incorporating a protection device.

2. Description of the Related Art

A high energy density secondary battery has been widely used as a power supply for small information equipment such as a portable phone and a notebook personal computer. The secondary batteries are often connected in series, the number of which corresponds to a voltage and current necessary for an objective apparatus or often used as an assembled battery in which they are connected in series or in parallel. Because a power supply voltage of the aforementioned small information equipment is about several V to 10V, the number of series connections in the assembled battery is 1 to 3.

On the other hand, in recent years, application of the secondary battery to purposes requiring a high output and high voltage such as household electric appliances, power tools, assisted bicycles and hybrid electric vehicles has been expanding rapidly as well as the power supply for the information equipment. Accompanied by this, the number of series connections in the assembled battery is increased, and it is not rare that 10 or more batteries are connected in series.

A prominent problem in connecting the batteries in series is a fluctuation between individual batteries (called cells). The fluctuation includes, for example, fluctuation in capacity, fluctuation in impedance, and fluctuation in the state of charge (SOC). A fluctuation which likely leads to an error of these ones is a fluctuation in voltage which is one of the fluctuations in the SOC.

If batteries having different capacities are connected in series or a plurality of batteries are connected under different SOCs, a cell having a higher voltage or a cell having a lower voltage than the average is generated in a fully charged state of the assembled battery. The cell having a higher voltage is turned into an overcharged state, whereby deterioration is intensified. If the charge is repeated, the cell whose deterioration is intensified by the overcharge has a reduced capacity, so that the overcharge is progressed, thereby accelerating the deterioration. As a result, the cycle service life of the assembled battery is shortened extremely than the service life of the cell.

The cause for the fluctuation in the SOC includes not only the fluctuation of the cell in an initial period but also a factor generated during use of the assembled battery. For example, sometimes there is a difference in temperature among the cells or currents discharged from each cell are different, thereby leading to a cause for the fluctuation in the SOC. Particularly, because the protection device is complicated in the assembled battery which has many series connections to output a high voltage, the discharge current by the protection device is apt to fluctuate.

To meet such a problem, generally, a technique of eliminating a fluctuation in charging voltage by appropriately executing charge called equalizing charge is adopted for an assembled battery of a nickel hydride battery. The nickel hydride battery has a feature that if the charge is attempted to be continued further in a state near the full charge, a charge reaction of an electrode material and a decomposition/recombination reaction of water in an electrolyte turn to competing reaction, so that the charge reaction is blocked. Thus, if the charge in an area beyond the full charge is carried out under an appropriate charge condition in which no deterioration of the battery is induced, the charging voltage of each cell can be arranged equally using an electrochemical current bypass function inside the battery. The technique for the equalizing charge is described in, for example, JP-A 2001-314046 (KOKAI).

On the other hand, in a secondary battery or capacitor using a nonaqueous electrolyte, a coulomb efficiency of charge/discharge is, in general, substantially 100%. Therefore, no current bypass function can be expected inside a battery such as a nickel hydride battery. To meet such a circumstance, there has been proposed a method of providing an equalizing circuit for bypassing each cell outside an assembled battery to bypass a charged current for a cell which exceeds a predetermined voltage, thereby suppressing a fluctuation in voltage among the cells. For example, JP-A 2002-238179 (KOKAI) has disclosed a technique for connecting a zener diode to each cell of an assembled battery in parallel to bypass a charged current of the cell which exceeds a zener voltage.

Even if the technique disclosed in JP-A 2002-238179 (KOKAI) is adopted, it is difficult to effectively eliminate the fluctuation in the voltage among the cells for the reason of the following problems.

If it is attempted to suppress the fluctuation in the voltage by bypass with a single element like a zener diode, the charging voltage is controlled by the fluctuation in the zener voltage. It is technically difficult to suppress the fluctuation in the zener voltage, like to manufacture a battery having a small fluctuation.

Further, a rise-up of the zener current when the zener voltage is reached is never steep. Due to the rise-up characteristic of the zener current, a bypass current flows from a voltage lower than a necessary charging voltage. For this reason, the technique of suppressing the fluctuation in the voltage by bypass with the zener diode cannot be adopted to a secondary battery whose voltage needs to be controlled in the order of several tens mV.

BRIEF SUMMARY OF THE INVENTION

An object of the present invention is to provide a protection device for an assembled battery, which enables the service life of the assembled battery to be extended while suppressing a fluctuation in the state of charge among cells, and a battery pack unit.

According to one aspect of the present invention, there is provided a protection device for an assembled battery including a plurality of secondary batteries connected in series, comprising: a sampling unit which includes a plurality of sample switches and individually samples voltages of the batteries of using the sample switches to generate a plurality of sampled voltages; a holding unit which holds the sampled voltages to generate a plurality of holding voltages; a multiplexer which sequentially reads the holding voltages and outputs each voltage to a common output node; a measuring unit configured to measure the individual voltages and the state of charges of the batteries based on a voltage of the common output node in a measuring period within a constant measuring cycle; and a control unit configured to turn on/off the sample switches at the same time within the measuring period and repeatedly turn on/off at least one sample switch selected from the plurality of sample switches in accordance with the state of charge in a term other than the measuring period.

BRIEF DESCRIPTION OF THE SEVERAL VIEWS OF THE DRAWING

FIG. 1 is a circuit diagram showing a protection device for an assembled battery and a battery pack unit incorporating the protection device according to a first embodiment;

DETAILED DESCRIPTION OF THE INVENTION

Figure 2:
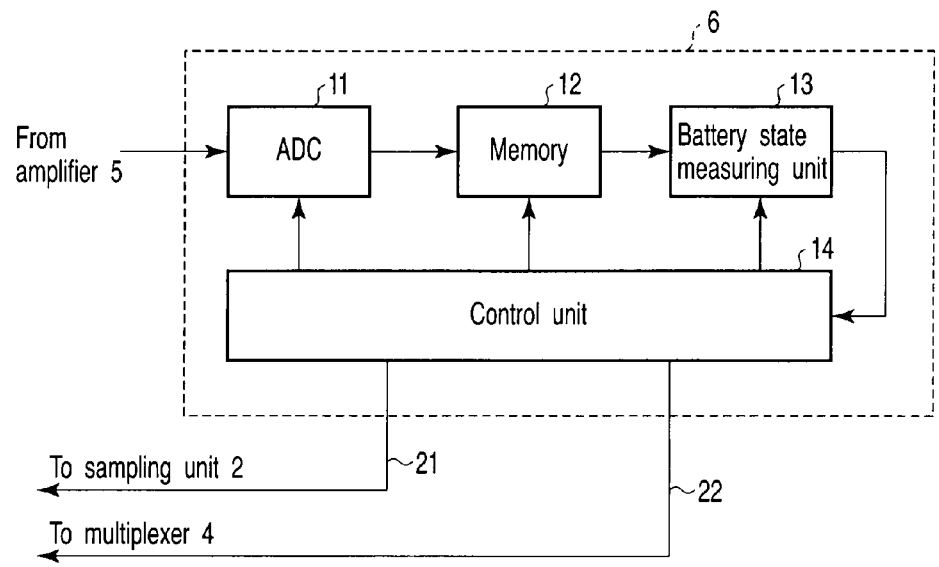
FIG. 2 is a block diagram showing the detail of a microcontroller in FIG. 1.

Hereinafter, embodiments of the present invention will be described with reference to the drawings.

First Embodiment

As shown in FIG. 1, a protection device according to a first embodiment of the present invention is applied to an assembled battery 1 including a plurality (n) of secondary batteries (hereinafter referred to as cells) B1 to Bn connected in series. The number n of the cells is also called the number of series connections. The protection device includes a sampling unit 2, a holding unit 3, a multiplexer 4, an amplifier 5 and a microcontroller 6. In some cases, a shunt resistor Rs for charge/discharge current measurement of the assembled battery is connected. Although the protection device may be accommodated in a different casing from the assembled battery 1, it can be accommodated in one casing together with the assembled battery 1 and used as a battery pack unit together with the assembled battery 1.

Basically, the protection device has a function of executing a charge prohibiting operation when a voltage (cell voltage) of each cell of the assembled battery reaches a charge prohibiting voltage and of executing a discharge prohibiting operation when the cell voltage reaches a discharge prohibiting voltage at the time of discharge. Description of the basic function is omitted here.

The sampling unit 2, the holding unit 3 and the multiplexer 4 constitute a so-called flying capacitor type voltage detection circuit. The sampling unit 2 includes n first sample switches S11H to S1$n$H respectively connected to positive terminals of the cells B1 to Bn at one ends thereof, n second sample switches S11L to S1$n$L respectively connected to negative terminals of cells B2 to Bn at one ends thereof, and n discharge switches S11D to S1$n$D. The negative terminal of the cell B1 is connected to the ground.

The sample switches S11H to S1$n$H and S11L to S1$n$L are controlled by a control unit in a microcontroller 6 as described later and turned ON at the same time. Thus, individual voltages (charging voltage) of the cells B1 to Bn are sampled by the sample switches S11 to S1$n$H and S12L to S1$n$L. The reason why two systems of the sample switches S11H to S1$n$H and S11L to S1$n$L is to sample a voltage between both ends but not for a voltage to ground of the cells B1 to Bn.

The holding unit 3 includes n capacitors (also referred to as flying capacitor) C1 to Cn, and holds voltages (sampled voltages) of the cells B1 to Bn sampled by the sample switches S11H to S1$n$H and S12L to S1$n$L. Thereafter, the sample switches S11H to S1$n$H and S12L to S1$n$L are turned off. The discharge switches S11D to S1$n$D of the sampling unit 2 respectively connected to the capacitors C1 to Sn in parallel are provided to discharge charges on the capacitors C to Cn.

A voltage (hold voltage) held by the capacitors C1 to Cn in the holding unit 3 is input to the multiplexer 4. The multiplexer 4 includes n reading switches S31 to S3$n$ respectively connected to one ends of the capacitors C1 to Cn on the high potential side, switches S21 to S2$n$ connected between the other ends of the capacitors C1 to Cn on the low potential side and the ground, and diodes respectively connected to the switches S21 to S2$n$ in parallel. The other ends of the reading switches S31 to Sn are connected to a common output node of the multiplexer 4.

In the multiplexer 4, the reading switches S31 to S3$n$ and S21 to S2$n$ are turned on sequentially under the control of the microcontroller 6 so as to read the held voltages of the capacitors C1 to Cn and output the read voltages from a common output node at the other ends of the reading switches S31 to S3$n$.

An output voltage from the common output terminal of the multiplexer 4 is amplified by the amplifier 5 and then input to the microcontroller 6. A terminal voltage of a current measurement shunt resistor Rs is amplified by the amplifier 7 and then input to the microcontroller 6. As shown in FIG. 2, the microcontroller 6 includes an analog-to-digital converter (ADC) 11, a memory 12, a battery state measuring unit 13 and a control unit 14. The control unit 14 outputs control signals 21 and 22 to be supplied to the sampling unit 2 and the multiplexer 4.

The output voltages from the amplifiers 5 and 7 are converted to a digital signal including an appropriate bit number by the ADC 11 and given to the memory 12 and the control unit 14. A timing signal and a conversion clock for providing with conversion timing of the ADC 11 are supplied from the control unit 14. Write and read of the memory 12 are carried out under the control of the control unit 14. That is, the digital signal output from the ADC 11 is written into the memory 12 under the control of the control unit 14 and read from the memory 12. The digital signal read from the memory 12 is input to the battery state measuring unit 13.

The protection device of this embodiment has a SOC measuring mode and a SOC balancing mode as its operation modes. In the SOC measuring mode, the control unit 14 controls the sampling unit 2, the multiplexer 4, the memory 12 and the battery state measuring unit 13 so as to operate synchronously in a constant cycle.

Under this control, the voltages of the cells B1 to Bn of the assembled battery 1 are sampled simultaneously by the sampling unit 2, held by the holding unit 3, multiplexed by the multiplexer 4 and then output sequentially from the common output node. The voltage output from the multiplexer 4 is fetched into the microcontroller 6 through the amplifier 5 and provided to the battery state measuring unit 13 through the ADC 11 and the memory 12.

The battery state measuring unit 13 measures the state of charge (SOC) of the assembled battery 1, more specifically, voltage balance, maximum voltage, minimum voltage and total voltage of the cells B1 to Bn of the assembled battery 1 by computation, and consequently, determines an overcharge or an overdischarge and detects imbalance among the cells B1 to Bn.

In the SOC measuring mode, the voltage sampled by the sampling unit 2 is accumulated in the capacitors C1 to Cn of the holding unit 3. Thereafter, the voltages of the capacitors C1 to Cn are sampled by the multiplexer 4. In this case, the charges on the capacitors C1 to Cn may be discharged through the discharging switches S11D to S1$n$D prior to next sampling or may be sampled next time with the charges left. However, all the cells B1 to Bn are discharged in the same way in the SOC measuring mode.

Because the discharging amount of the assembled battery 1 is desired to be as small as possible in the SOC measuring mode, the sampling operation of the sampling unit 2 and discharge of the assembled battery 1 by the discharge operation of the capacitors C1 to Cn of the holding unit 3 are, in general, suppressed to a minimum limit.

On the other hand, if it is determined that the SOC of the cells B1 to Bn is fluctuated in the SOC measuring mode according to this embodiment, a period other than the SOC measuring period is defined as a SOC balancing mode. In the SOC balancing mode, the number of sampling operations (on/off cycles) of the sample switch inside the sampling unit 2 corresponding to a cell having a relatively large SOC (overcharged cell) is increased in a period other than the SOC measuring period. As a result, the SOC fluctuation is eliminated by discharging the cells B1 to Bn more than at the time of SOC measurement.

A detailed operation procedure of the protection device according to this embodiment will be described using a flowchart shown in FIG. 3. The processing of FIG. 3 includes a SOC measuring routine for executing the SOC measuring mode processing and a SOC balancing routine for executing the SOC balancing mode processing. The processing is started by activating the protection device and carried out under the control of the control unit 14.

(SOC Measuring Routine)

In the SOC measuring routine, all the sample switches S11H to S1$n$H and S11L to S1$n$L of the sampling unit 2 are turned on (step S101), and next the sample switches S11H to S1$n$H and S11L to S1$n$L are turned off (step S102). Voltages of the cells B1 to Bn of the assembled battery 1 are sampled by the operation of the sampling unit 2, and the sampled voltages are held by the capacitors C1 to Cn of the holding unit 3.

Next, the reading switches S31 to S3$n$ and S21 to S2$n$ of the multiplexer 3 are turned on/off sequentially one pair at a time (steps S103 to S108). Consequently, the voltages held by the capacitors C1 to Cn are read and fetched from the common output node. In the SOC measuring routine, the state of charge, i.e., SOC of the assembled battery 1, for example, voltage balances, maximum voltage, minimum voltage and total voltage of the cells B1 to Bn of the assembled battery 1 are measured thereby to determine an overcharge or overdischarge and detect imbalance among the cells B1 to Bn.

(SOC Balancing Routine)

When the aforementioned SOC measuring routine is terminated, the processing is proceeded to the SOC balancing routine. In the SOC balancing routine, whether or not the fluctuation in the voltage among the cells B1 to Bn is within tolerable limits is determined based on a result of measurement on the voltage balance, maximum voltage, minimum voltage and total voltage of the cells B1 to Bn obtained in the SOC measuring routine (S109). As a result, if the voltage fluctuation is within the tolerable limits, the processing is returned to step S101, in which the SOC measuring routine is repeated.

Unless the voltage fluctuation is within the tolerable limits, it is determined that the cell whose voltage exceeds a preliminarily determined threshold as well as the cell whose voltage is maximum is an overcharged cell (step S110). Here, assuming that the cell Bx is determined to be an overcharged cell, next, the sample switches S1$x$H, S1$x$L and S1$x$D, which are associated with the cell Bx, are turned on/off sequentially (steps S111 to S114).

Figure 4:
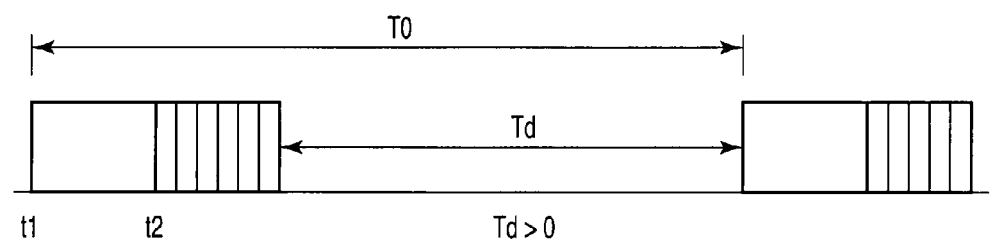
FIG. 4 is a timing chart for explaining a timing relation between a SOC measuring routine and a SOC balancing routine in FIG. 3.

If the sample switches S1$x$H, S1$x$L and S1$x$D are turned on/off sequentially, whether dead time Td shown in FIG. 4 is 0 or not is determined in step S115. Steps S111 to S114 are repeated until Td reaches 0, and S1$x$H, S1$x$L and S1$x$D are turned on/off repeatedly. When Td reaches 0, the processing is returned to step S101, in which the SOC measuring routine is restarted.

In FIG. 4, t1 and t2 are startup time and end time of the SOC measuring routine, and an interval between t1 to t2 is a SOC measurement period. The SOC balancing routine is started from time t2. T0 is a SOC measurement cycle, and the dead time Td is a time interval from a current termination time of the repeated on/off operations of the sample switches S1$x$H, S1$x$L and S1$x$D up to a initiation time of a next SOC measurement period. In the processing example of FIG. 3, the sample switches S1$x$H, S1$x$L and S1$x$D are turned on/off repeatedly in a period of Td>0 as shown in FIG. 4.

According to this embodiment, only for example, a sample switch corresponding to an overcharged cell in the sampling unit 2 is turned on/off in the SOC balancing mode. Consequently, the fluctuation in the charging voltage among the cells B1 to Bn of the assembled battery 1, that is, the fluctuation in the SOC can be eliminated with a high precision. In this case, a circuit element for SOC measurement which uses the sampling unit 2 as a main element is used in the SOC balancing mode. For this reason, any extra circuit for the SOC balancing is not required, which enables reduction of a consumption current of the entire protection device.

Figure 6:
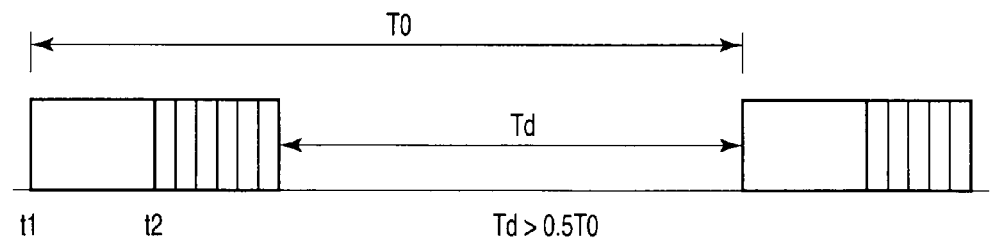
FIG. 6 is a timing chart for explaining a timing relation between a SOC measuring routine and a SOC balancing routine in FIG. 5.
Figure 3:
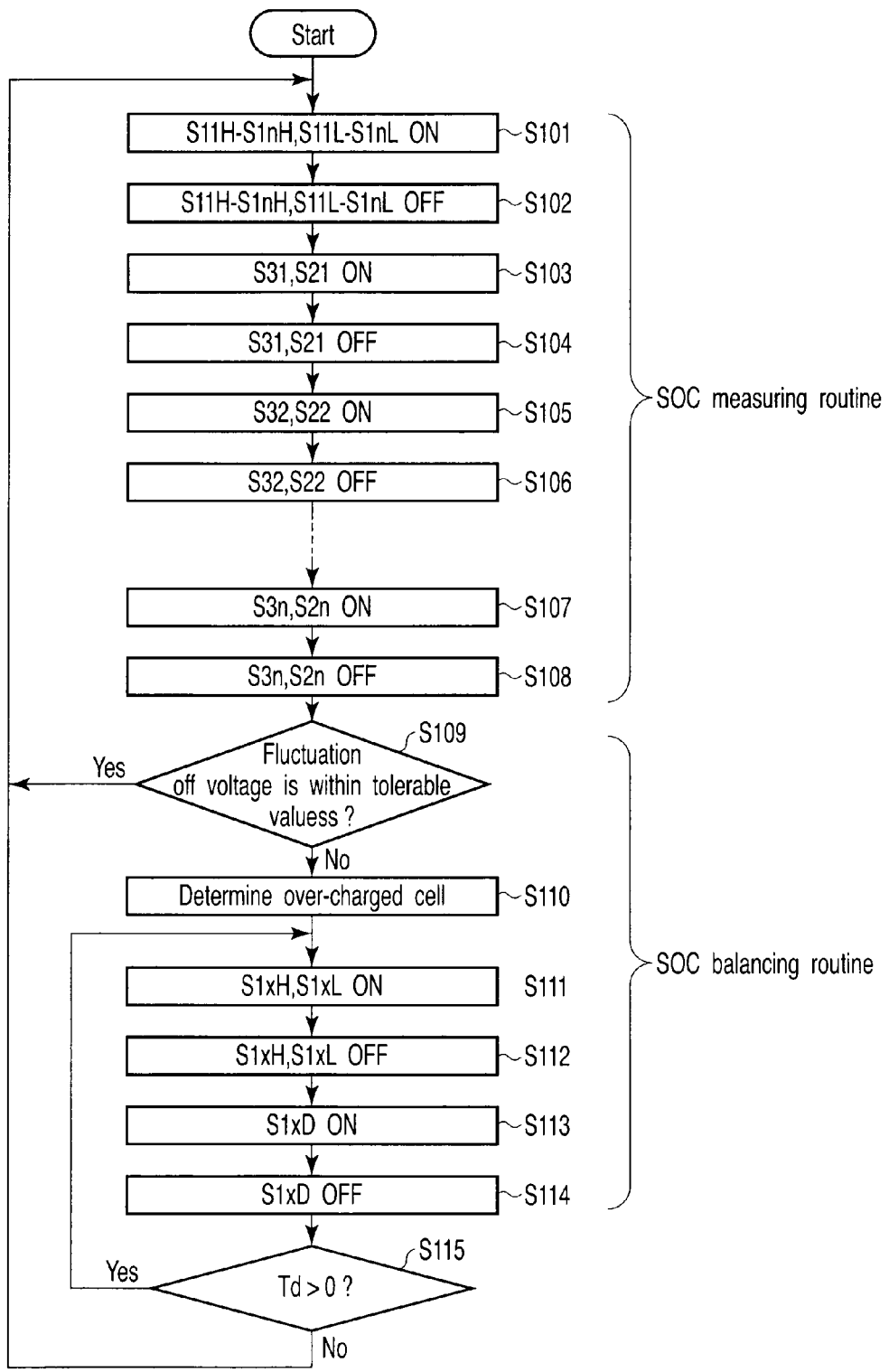
FIG. 3 is a flowchart showing an example of the operation procedure in the first embodiment.
Figure 5:
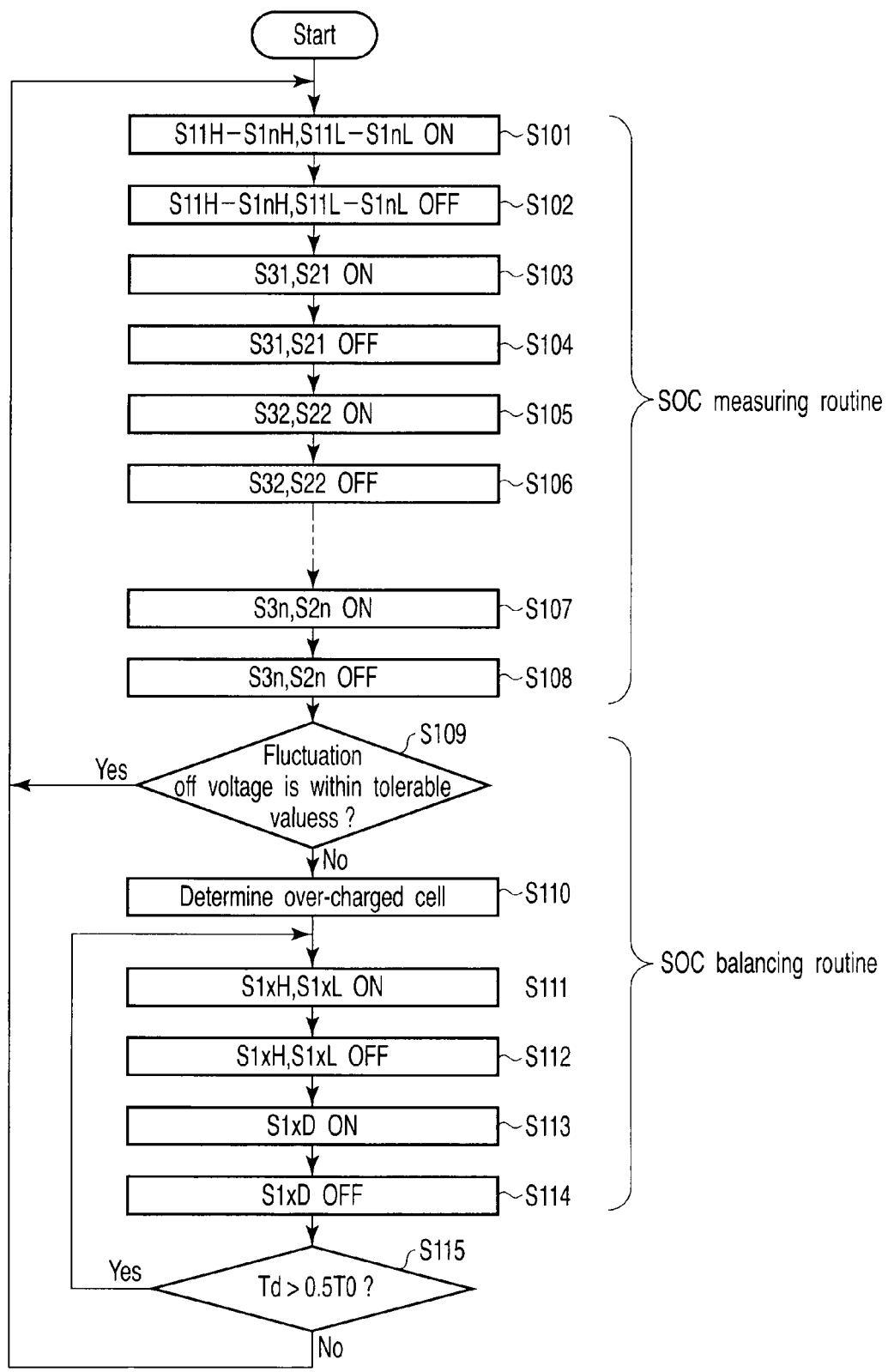
FIG. 5 is a flowchart showing another example of the operation procedure in the first embodiment.

The flowchart shown in FIG. 5 shows another operation procedure of the protection device, and the processing of the final step S115 of the SOC balancing routine is different from that in FIG. 3. More specifically, in step S115 in FIG. 5, while the sample switches S1$x$H, S1$x$L and S1$x$D are turned on/off repeatedly, it is determined whether or not the dead time Td described in FIG. 4 is T0>Td>0.5T0 as shown in FIG. 6, and on/off operation of the S1$x$H, S1$x$L and S1$x$D is repeated until Td reaches 0.5T0. When Td reaches to 0.5T0, the processing is returned to step S101, in which the SOC measuring routine is restarted.

The SOC measurement cycle T0 should be 0.1 to several seconds although depending on the purpose. Generally, the capacitors C1 to Cn have a relatively small capacity because they are for SOC measurement. To adjust the SOC fluctuation with the capacitors C1 to Cn having a small capacity, the discharge operation of the overcharged cell by on/off of the sample switch needs to be carried out plural times continuously. If the aforementioned condition of T0>Td>0.5T0 is satisfied, the SOC balancing operation can be carried out effectively by turning on/off the sample switch corresponding to the overcharged cell as many times as possible, and also it is possible to suppress the influence on the SOC measurement by overdischarge to a minimum extent.

Second Embodiment

Next, a second embodiment of the present invention will be described. The configuration of an entire protection device according to the second embodiment is as shown in FIG. 1, and the internal configuration and operation of a microcontroller 6 are different from those in the first embodiment.

Figure 7:
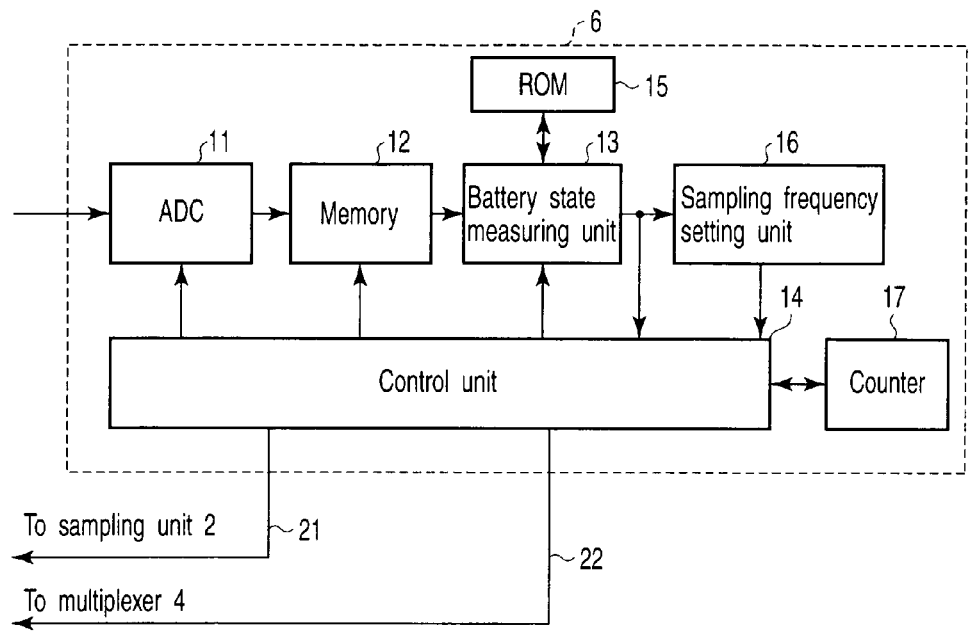
FIG. 7 is a block diagram showing the detail of a microcontroller according to a second embodiment.

FIG. 7 shows the detail of the microcontroller 6 of the second embodiment. The microcontroller 6 includes the ADC 11, the memory 12, the battery state measuring unit 13, the control unit 14, a ROM 15, a sampling frequency setting unit 16 and a counter 17. Turning on/off the sample switches S11H to S1nH and S11L to S1nL of the sampling unit 2 in the SOC measuring period is the same as in the first embodiment. The ROM 15 stores, for example, a SOC table to voltage, temperature and current, as described later.

Generally, the SOC fluctuation is measured by comparing the voltages of the cells B1 to Bn. However, the change of voltage to the SOC fluctuation is very small depending on the kind or state of the battery and the influence of other factors such as temperature difference and measuring error is large. Therefore, in some cases, the SOC fluctuation cannot be measured precisely. Thus, a state which enables the battery state measuring unit 13 to measure the SOC fluctuation among the cells B1 to Bn of the assembled battery is defined as a state-of-charge deviation detection event (hereinafter, called SOC deviation detection event) and then, the SOC fluctuation is corrected by making use of the SOC deviation detection event.

That is, when the SOC deviation detection event is detected, a sample switch in the sampling unit 2 corresponding to a cell (overcharged cell) having a relatively large SOC in a period other than the SOC measuring period is turned on/off repeatedly. Consequently, the overcharged cell can be discharged more than at the time of SOC measurement, to eliminate the SOC fluctuation.

In this case, the SOC deviation of the cells B1 to Bn when the SOC deviation detecting event occurs is stored in the memory 12. Until the frequency of generation of the SOC deviation reaches an appropriate one, or a next SOC deviation detection event occurs, the sample switch corresponding to the overcharged cell of the sampling unit 2 is turned on/off repeatedly. This enables even a small discharge current to correct the SOC fluctuation effectively with a high precision.

Hereinafter, the SOC deviation detection event will be described in detail.

Although the arrangement of the SOC is different depending on the type of the battery, it is, in general, often desirable to make an arrangement in a fully charged state in case of a nonaqueous electrolyte secondary battery. The reason is that the overcharged cell needs to be prevented from being in a non-safety state due to the voltage fluctuation in the charged state or that generally deterioration of the battery due to rise of resistance is higher as the charging potential is increased and if the voltage is fluctuated depending on the charged state, the degree of deterioration can fluctuate due to the influence.

On the other hand, if the SOC fluctuation is computed from a difference in voltage between cells to be measured, the accuracy of the SOC to be measured can be increased as the voltage change rate to the battery capacity is increased. Depending on the material of electrodes constituting the battery, the voltage change rate to the battery capacity can be increased in an area in the vicinity of the fully charged charge. Thus, a technique for computing the SOC fluctuation from the difference in voltage is preferable for arrangement of the SOC at a high accuracy in the vicinity of the fully charged state.

A prominent factor other than the voltage measurement accuracy affecting the SOC computation is a charge/discharge current. It is evident that in the same SOC, the voltage is changed in accordance with the fluctuation of the internal impedance of the battery when a charging current or discharging current flows in a battery. Accordingly, the technique of computing the SOC from an open circuit voltage measured in a state that no current flows ensures the highest accuracy. However, there also exists an application field which is hardly left as it is with its battery fully charged, like for example, a hybrid automobile. In such a case, even if the charging current is flowing, the opportunity for computing the SOC can be increased by computing the SOC from the battery voltage.

If a case which satisfies two conditions that the charging/discharging current is $I \leq I0$ and the voltage maximum value of the cell is $Vcmax > V0$ is regarded as the state-of-charge deviation detection event by considering the above-described points, both the SOC computing accuracy and SOC computing opportunity can be satisfied. In this case, I indicates a charging/discharging current, and Vcmax indicates a voltage maximum value of the cell. I0 indicates an arbitrary current value which satisfies a condition of $I0 \leq 20$ [mV]/Rdc [m$\Omega$] when a DC impedance of the cell at 25° C. is Rdc [m$\Omega$]. V0 indicates an arbitrary voltage in a range of $V1 \leq V0 \leq VH$ where VH is a fully charging voltage of the cell and V1 is a voltage of the cell when the voltage change rate A [V/% SOC] to the battery capacity in case where the constant current charging of 1 C is carried out at 25° C. reaches A=20 [mV/% SOC] from A<20 [mV/% SOC].

Figure 8:
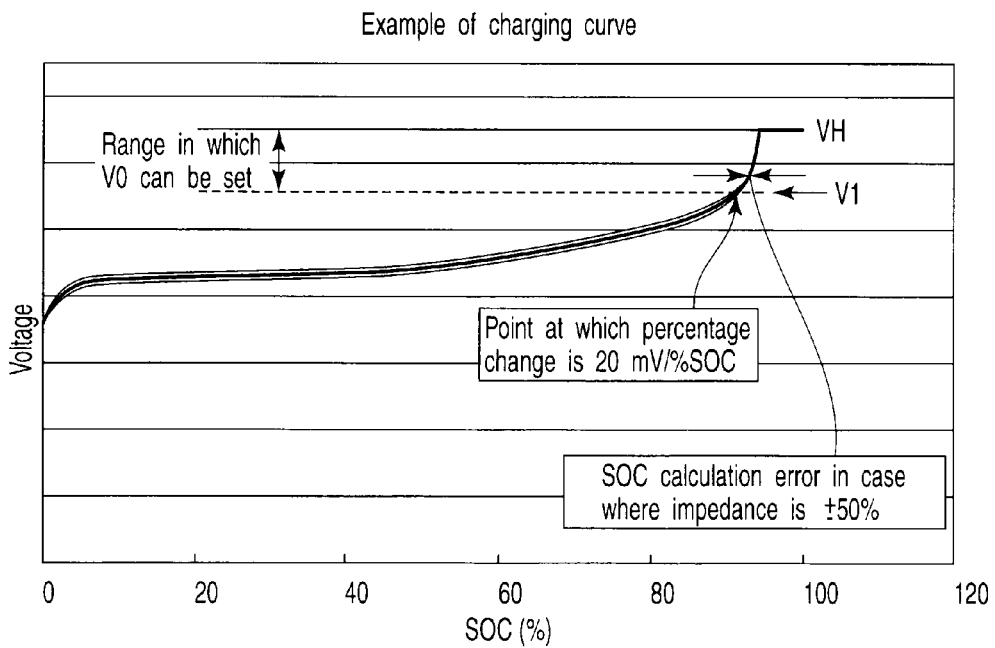
FIG. 8 is a diagram showing a charging curve of a cell for explaining an occurrence condition of a state-of-charge deviation detecting event in the second embodiment.

FIG. 8 shows an example of a charging curve of the cell at this time. If V0 is set in the indicated range (range in which V0 can be set), the charging curve rises when Vcmax>V0, so that the detection sensitivity of the SOC fluctuation is intensified. Further, even if the fluctuation of the impedance of the battery is large (for example, ±50%), the SOC computation error due to (battery impedance fluctuation)×(charging current) is sufficiently small. Consequently, the SOC fluctuation can be detected with high accuracy.

Electrode materials whose voltage change rate in the vicinity of the fully charged state is increased are, for example, the following materials. Examples of a cathode material include lithium-manganese composite oxide ($Li_xMn_2O_4$ ($0 \leq x \leq 1$)), and spinel-type lithium-manganese nickel composite oxide. Examples of an anode material include many composite metal oxides such as lithium titanate having a spinel structure (for example, $Li_{4+x}Ti_5O_{12}$ ($0 \leq x \leq 3$)) and ramsdelite type lithium titanate (for example, $Li_{2+y}Ti_3O_7$ ($0 \leq y \leq 3$)).

Electrode materials whose voltage change rate is increased in the vicinity of the fully charged state may be applied to both the cathode and anode or to only one. Of them, the spinel structure lithium titanate as an anode active material is preferred because it is excellent in large current performance and fast charging performance, and its voltage change rate A in the fully charged state is sufficiently larger than 20 [mV/% SOC], so that values of 100 to 200 [mV/% SOC] can be obtained easily.

Next, the detailed operation procedure of the protection device of this embodiment will be described using a flowchart shown in FIG. 9. The processing of FIG. 9 includes a SOC measuring routine for executing the SOC measuring mode processing and a SOC balancing routine for executing SOC balancing mode processing. The processing is started by activating the protection device and carried out under the control of the control unit 14.

(SOC Measuring Routine)

The SOC measuring routine is the same as the SOC measuring routine shown in FIG. 5 in the first embodiment, and steps S201 to S208 are the same processing's in steps S101 to S108 in FIG. 5. In the SOC measuring routine, the state of charge, i.e., SOC of the assembled battery 1, for example, voltage balances, maximum voltage, minimum voltage and total voltage of the cells B1 to Bn of the assembled battery 1 are measured thereby to determine an overcharge or overdischarge and detect imbalance among the cells B1 to Bn.

(SOC Balancing Routine)

After the above-described SOC measuring routine, the processing proceeds to the SOC balancing routine. In the SOC balancing routine of this embodiment, first, whether or not a SOC deviation detection event occurs is investigated (step S209).

If the SOC deviation detection event occurs, determination of the overcharged cell and setting of sampling frequency are carried out (step S210). In step S210, whether or not the voltage fluctuation among the cells B1 to Bn is within tolerable limits is determined based on a result of measurement on the voltage balance, maximum voltage, minimum voltage and total voltage of the cells B1 to Bn, detected in the SOC measuring routine as in step S109 of FIG. 5. Unless the voltage fluctuation is within the tolerable limits, the cell whose voltage exceeds a preliminarily determined threshold as well as the cell whose voltage is at maximum is determined to be an overcharged cell. Further, in step S210, the sampling frequency is set to be increased as the SOC deviation is increased.

Assuming that the cell Bx is determined to be an overcharged cell, next, the sample switches S1xH, S1xl and S1xD, which are associated with the cell Bx, are turned on/off repeatedly (steps S211 to S214). While the sample switches S1xH, S1xL and S1xD are turned on/off repeatedly, whether or not the dead time Td is T0>Td>0.5T0 shown in FIG. 6 is determined in step S215. Until Td reaches 0.5T0, on/off operation of the sample switches S1xH, S1xL, S1xD in steps S211 to S214 is repeated. When Td reaches 0.5T0, the processing is returned to the initial step S201, in which the SOC measuring routine is restarted.

On the other hand, unless the SOC deviation detection event occurs in step S209, whether or not the sampling frequency is a set value (sampling frequency set in step S210) or more is determined in step S216. If the sampling frequency is the set value or more, the processing is returned to step S201, in which the SOC measuring routine is started. Unless the sampling frequency reaches the set value, the processing is returned to step S211, in which on/off operation of the sample switches S1xH, S1xL and S1xD corresponding to the overcharged cell is repeated.

Figure 9:
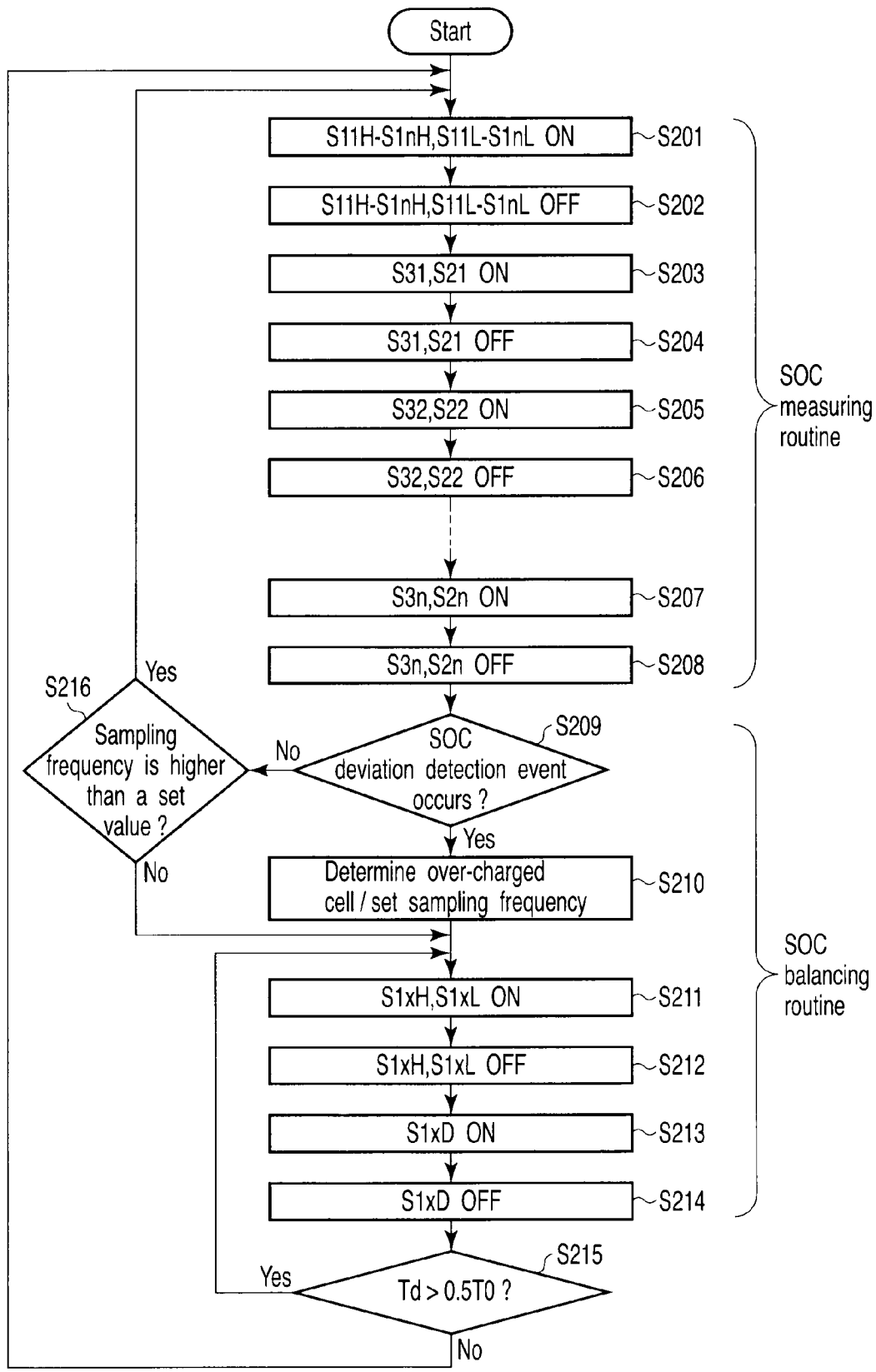
FIG. 9 is a flowchart showing the operation procedure in the second embodiment.

In the flowchart of FIG. 9, the setting processing for the sampling frequency in step S210 and the determination processing for the sampling frequency in step S216 may be omitted. More specifically, if the SOC deviation detection event occurs in step S209, it is permissible to repeat on/off operation of the sample switch in steps S211 to S215 to the overcharged cell determined in step S210 until the SOC deviation detection event occurs again.

According to this embodiment, when the SOC deviation detection event occurs in the SOC balancing mode, the sample switch corresponding to the overcharged cell in the sampling unit 2 is turned on/off by just a sampling frequency meeting the SOC deviation detection or each time when the SOC deviation detection event occurs. Consequently, the fluctuation of the charging voltage among the cells B1 to Bn of the assembled battery 1, that is, the SOC fluctuation can be eliminated at a high accuracy.

Next, the embodiment of the present invention described above will be described further in detail. Specific examples 1 and 2 below correspond to the first embodiment and Specific example 3 corresponds to the second embodiment.

SPECIFIC EXAMPLE 1

A nonaqueous electrolyte secondary battery having a discharge capacity of 3Ah is manufactured using spinel type lithium titanate as an anode active material and lithium cobaltate as a cathode active material. 10 nonaqueous electrolyte secondary batteries thus prepared are connected as the cells B1 to Bn (n=10) in series as shown in FIG. 1 to manufacture an assembled battery 1. Terminals of the cells B1 to Bn of the assembled battery 1 are connected to the sampling unit 2 through a voltage measuring lead wire as shown in FIG. 1. An interval for voltage measurement (SOC measurement) is set to one second. When a difference in voltage between the cells measured is over 100 mV, on/off operation of the sample switch is repeated on a cell which indicates the highest voltage (overcharged cell) at a frequency of about 100 kHz so as to discharge a corresponding capacitor of the holding unit 3. The discharge of the capacitor is continued up to next voltage detection timing. The operation flow of the protection device at this time is as shown in FIG. 3.

SPECIFIC EXAMPLE 2

An assembled battery is manufactured in the same manner as in Specific example 1. An interval for voltage detection is set to one second. When a difference in voltage between the cells measured is over 100 mV, on/off operation of the sample switch is repeated on a cell which indicates the highest voltage (overcharged cell) at a frequency of about 100 kHz so as to discharge a corresponding capacitor of the holding unit 3. The discharge of the capacitor is set to end when half the voltage measuring interval t0 has been elapsed since start of voltage measurement, and stopped until a next voltage measurement. The operation flow of the protection device at this time is as shown in FIG. 5.

SPECIFIC EXAMPLE 3

An assembled battery is manufactured in the same manner as in Specific example 1. The nonaqueous electrolyte secondary battery for use has a voltage of the cell of V1=2.62 V and a fully-charging voltage of $V_H$=2.8 [V] when the DC impedance at 25° C. is 6 mΩ and the voltage change rate A [V/% SOC] to the battery capacity reached A=20 [mV/% SOC] from A<20 [mV/% SOC]. I0=3 [A] is set so that I0≦3.3 [A]=20 [mV]/Rdc [mΩ] and V0=2.65 V is set so that V1≦V0≦$V_H$. A case which satisfies a charging/discharging current I≦I0 and a maximum value of cell voltage Vcmax>V0 is determined as a state-of-charge deviation detection event.

The voltage measuring interval is set to one second and voltage data of each cell measured at the same time is stored in the memory 12 and then, a SOC deviation is computed according to a SOC table to the voltage, temperature and current stored in the ROM 15 preliminarily. Next, a discharging electric quantity meeting the smallest SOC of the cells is calculated for each cell to calculate a necessary sampling frequency. On/off operation of the sample switch is repeated to the overcharged cell at a frequency of about 100 kHz only in a period until 0.5 seconds have passed from a start of voltage measurement since the voltage measurement is ended so as to discharge a corresponding capacitor of the holding unit 3. This operation is continued until the state-of-charge detection event occurs next or until a necessary sampling frequency is reached in all the cells. The operation flow of the protection device at this time is as shown in FIG. 9.

COMPARATIVE EXAMPLE

The assembled battery is manufactured in the same manner as in Specific example 1. A switch connected to a capacitor of a holding unit is set to open/close only at the time of detection of voltage every second. The manufactured assembled battery is subjected to a cycle test by charging with constant voltage and constant current of 28 V and 10 A at 45° C. for an hour and then discharging with a constant current of 10 A until the voltage minimum value of the cell reaches 2.0 V. With the charge prohibiting voltage of the protection device set to 2.9 V and the discharge prohibiting voltage set to 1.5 V, the test is terminated if the cell voltage exceeds the range.

The capacity retention after 3000 cycles and the voltage fluctuation (maximum value-minimum value) between the cells when the charging is ended are expressed in Table 1.

TABLE 1

|  | Capacity retention after 3000 cycles | Voltage fluctuation among cells after 3000 cycles |
| --- | --- | --- |
| Specific example 1 | 69% | 120 mV |
| Specific example 2 | 71% | 105 mV |
| Specific example 3 | 78% | 20 mV |
| Comparative example | Stopped at 2400 cycles | At the time of 2400 cycles |

Specific examples 1 to 3 based on the first embodiment show that the fluctuation in the voltage among the cells is suppressed to a small level until the test of 3000 cycles is ended, indicating a high capacity maintenance ratio. In Comparative example, on the other hand, the fluctuation in the voltage among the cells is expanded, and a cell which exceeds the charge prohibiting voltage at 2400 cycles has appeared. Thus, the test is stopped halfway.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A protection device for an assembled battery including a plurality of secondary batteries connected in series, the protection device comprising:
a sampling unit which includes a plurality of sample switches and individually samples voltages of the batteries using the sample switches to generate a plurality of sampled voltages;
a holding unit which holds the sampled voltages to generate a plurality of holding voltages;
a multiplexer which sequentially reads the holding voltages and outputs each voltage to a common output node;
a measuring unit configured to measure the individual voltages and a state of charges of the batteries based on a voltage of the common output node in a measuring period within a constant measuring cycle; and
a control unit configured to turn on/off the sample switches at the same time within the measuring period and repeatedly turn on/off at least one sample switch selected from the plurality of sample switches in accordance with the state of charge in a term other than the measuring period,
wherein the sampling unit further includes a plurality of discharge switches for discharging charges of a plurality of capacitors, and
wherein the control unit includes a determining unit to determine an overcharged cell based on the individual voltages of the batteries and a selecting unit to select at least one sample switch corresponding to the overcharged cell from the plurality of sample switches in the term other than the measuring period and turns on the selected sample switch, turns off the selected sample switch, turns on the discharge switch which discharges a charge of a capacitor corresponding to the overcharged cell, and turns off the discharge switch in that order.

2. The device according to claim 1, wherein the control unit is configured to control the sample switches to satisfy a condition of T0>Td>0.5T0 when the measuring cycle is T0 and a time interval from a current termination time of the repeated on/off operation up to a initiation time of a next measuring period of the repeated on/off operation is Td.

3. A protection device for an assembled battery including a plurality of secondary batteries connected in series, the protection device comprising:
a sampling unit which includes a plurality of sample switches and individually samples voltages of the batteries using the sample switches to generate a plurality of sampled voltages;
a holding unit which holds the sampled voltages to generate a plurality of holding voltages;
a multiplexer which sequentially reads the holding voltages and outputs each voltage to a common output node;
a measuring unit configured to measure the individual voltages and the state of charges of the batteries based on a voltage of the common output node in a measuring period within a constant measuring cycle; and
a control unit configured to turn on/off the sample switches at the same time within the measuring period and repeatedly turn on/off at least one sample switch selected from the plurality of sample switches in accordance with the state of charge in a term other than the measuring period, wherein
the measuring unit is configured to measure the state of charge including the individual voltages of the batteries and a state-of-charge deviation among the secondary batteries,
the protection device further comprises a memory which stores the state-of-charge deviation when a preliminarily determined state-of-charge deviation detection event is detected,
the control unit is configured to turn on/off at least one sample switch selected within the term other than the measuring period the number of times of increase corresponding to the stored state-of-charge deviation,
the state-of-charge deviation detection event is detected when a charging/discharging current is I≦I0 and a voltage maximum value of the battery is Vcmax>V0, where I indicates the charging/discharging current, Vcmax indicates the voltage maximum value, I0 indicates an arbitrary current value which satisfies a condition of I0 ≦20 [mV]/Rdc [mΩ] when a DC impedance of the battery is Rdc [mΩ] at 25° C.; and V0 indicates an arbitrary voltage in a range of V1≦V0≦VH, where V1 is a cell voltage in a case where a voltage change rate A [V/% SOC] to the cell capacity reaches A=20 [mV/% SOC] from A<20 [mV/% SOC] under a condition that constant current charge of 1 C is executed at 25° in the battery, and VH is a fully charging voltage of the battery.

4. The device according to claim 3, wherein the control unit includes a determining unit to determine an overcharged cell from the individual voltages of the secondary batteries, and a selecting unit to select at least one sample switch corresponding to the overcharged cell from the plurality of sample switches and turn on/off the selected sample switch the number of times.

5. A protection device for an assembled battery including a plurality of secondary batteries connected in series, the protection device comprising:
   a sampling unit which includes a plurality of sample switches and individually samples voltages of the batteries using the sample switches to generate a plurality of sampled voltages;
   a holding unit which holds the sampled voltages to generate a plurality of holding voltages;
   a multiplexer which sequentially reads the holding voltages and outputs each voltage to a common output node;
   a measuring unit configured to measure the individual voltages and the state of charges of the batteries based on a voltage of the common output node in a measuring period within a constant measuring cycle; and
   a control unit configured to turn on/off the sample switches at the same time within the measuring period and repeatedly turn on/off at least one sample switch selected from the plurality of sample switches in accordance with the state of charge in a term other than the measuring period, wherein
   the measuring unit is configured to measure the state of charge including individual voltages of the batteries and a state-of-charge deviation among the batteries,
   the control unit is configured to repeatedly turn on/off at least one sample switch selected each time when a preliminarily determined state-of-charge deviation detection event is detected, and
   the state-of-charge deviation detection event is detected when a charging/discharging current is I≦I0 and a voltage maximum value of the battery is Vcmax>V0, where I indicates the charging/discharging current; Vcmax indicates the voltage maximum value; I0 indicates an arbitrary current value which satisfies a condition of I0≦20 [mV]/Rdc [mΩ] when a DC impedance of the battery is Rdc [mΩ] at 25° C.; and V0 indicates an arbitrary voltage in a range of V1≦V0≦VH, where V1 is a cell voltage in a case where a voltage change rate A [V/% SOC] to the cell capacity reaches A=20 [mV/% SOC] from A<20 [mV/% SOC] under a condition that constant current charge of 1 C is executed at 25° in the battery, and VH is a fully charging voltage of the battery.

6. The device according to claim 5, wherein the control unit includes a determining unit to determine an overcharged cell based on the individual voltages of the batteries and a selecting unit to select at least one sample switch corresponding to the overcharged cell from the plurality of sample switches and turn on/off the selected sample switch.

7. A battery pack unit comprising:
   an assembled battery including a plurality of secondary batteries connected in series;
   a sampling unit which includes a plurality of sample switches and individually samples voltages of the batteries using the sample switches to generate a plurality of sampled voltages;
   a holding unit which holds the sampled voltages to generate a plurality of holding voltages;
   a multiplexer which sequentially reads the holding voltages and outputs each voltage to a common output node;
   a measuring unit configured to measure the individual voltages and the state of charges of the batteries based on a voltage of the common output node in a measuring period within a constant measuring cycle; and
   a control unit configured to turn on/off the sample switches at the same time within the measuring period and repeatedly turn on/off at least one sample switch selected from the plurality of sample switches in accordance with the state of charge in a term other than the measuring period, wherein
   the sampling unit further includes a plurality of discharge switches for discharging charges of a plurality of capacitors,
   the control unit includes a determining unit to determine an overcharged cell based on the individual voltages of the batteries and a selecting unit to select at least one sample switch corresponding to the overcharged cell from the plurality of sample switches in the term other than the measuring period and turns on the selected sample switch, turns off the selected sample switch, turns on the discharge switch which discharges a charge of a capacitor corresponding to the overcharged cell, and turns off the discharge switch in that order.

8. The battery pack according to claim 7, wherein the control unit is configured to control the sample switches to satisfy a condition of T0>Td>0.5T0 when the measuring cycle is T0 and a time interval from a current termination time of the repeated on/off operation up to a initiation time of a next measuring period of the repeated on/off operation is Td.

9. A battery pack unit, comprising:
   an assembled battery including a plurality of secondary batteries connected in series;
   a sampling unit which includes a plurality of sample switches and individually samples voltages of the batteries using the sample switches to generate a plurality of sampled voltages;
   a holding unit which holds the sampled voltages to generate a plurality of holding voltages;
   a multiplexer which sequentially reads the holding voltages and outputs each voltage to a common output node;
   a measuring unit configured to measure the individual voltages and a state of charges of the batteries based on a voltage of the common output node in a measuring period within a constant measuring cycle; and
   a control unit configured to turn on/off the sample switches at the same time within the measuring period and repeatedly turn on/off at least one sample switch selected from the plurality of sample switches in accordance with the state of charge in a term other than the measuring period, wherein
   the measuring unit is configured to measure the state of charge including the individual voltages of the batteries and a state-of-charge deviation among the secondary batteries,
   the protection device further comprises a memory which stores the state-of-charge deviation when a preliminarily determined state-of-charge deviation detection event is detected, the control unit is configured to turn on/off at least one sample switch selected within the term other than the measuring period the number of times of increase corresponding to the stored state-of-charge deviation, and the state-of-charge deviation detection event is detected when a charging/discharging current is I≦I0 and a voltage maximum value of the battery is Vcmax>V0, where I indicates the charging/discharging current, Vcmax indicates the voltage maximum value, I0 indicates an arbitrary current value which satisfies a condition of I0≦20 [mV]/Rdc [mΩ] when a DC impedance of the battery is Rdc [mΩ] at 25° C.; and V0 indicates an arbitrary voltage in a range of V1≦V0≦VH, where V1 is a cell voltage in a case where a voltage change rate A [V/ % SOC] to the cell capacity reaches A=20 [mV/ % SOC] from A<20 [mV/ % SOC] under a condition that constant current charge of 1 C is executed at 25° in the battery, and VH is a fully charging voltage of the battery.

10. The battery pack according to claim 9, wherein the control unit includes a function of determining an overcharged cell from the individual voltages of the secondary batteries, and the control unit is configured to select at least one sample switch corresponding to the overcharged cell from the plurality of sample switches and turn on/off the selected sample switch the number of times.

11. A battery pack unit, comprising:
an assembled battery including a plurality of secondary batteries connected in series;
a sampling unit which includes a plurality of sample switches and individually samples voltages of the batteries using the sample switches to generate a plurality of sampled voltages;
a holding unit which holds the sampled voltages to generate a plurality of holding voltages;
a multiplexer which sequentially reads the holding voltages and outputs each voltage to a common output node;
a measuring unit configured to measure the individual voltages and a state of charges of the batteries based on a voltage of the common output node in a measuring period within a constant measuring cycle; and
a control unit configured to turn on/off the sample switches at the same time within the measuring period and repeatedly turn on/off at least one sample switch selected from the plurality of sample switches in accordance with the state of charge in a term other than the measuring period, wherein the measuring unit is configured to measure the state of charge including individual voltages of the batteries and a state-of-charge deviation among the batteries, the control unit is configured to repeatedly turn on/off at least one sample switch selected each time when a preliminarily determined state-of-charge deviation detection event is detected, and the state-of-charge deviation detection event is detected when a charging/discharging current is I≦I0 and a voltage maximum value of the battery is Vcmax>V0, where I indicates the charging/discharging current, Vcmax indicates the voltage maximum value, I0 indicates an arbitrary current value which satisfies a condition of I0≦20 [mV]/rdc [mΩ] when a DC impedance of the battery is Rdc [mΩ] at 25° C.; and V0 indicates an arbitrary voltage in a range of V1≦V0≦VH, where V1 is a cell voltage in a case where a voltage change rate A [V/ % SOC] to the cell capacity reaches A=20 [mV/ % SOC] from A <20 [mV/ % SOC] under a condition that constant current charge of 1 C is executed at 25° in the battery, and VH is a fully charging voltage of the battery.

12. The battery pack according to claim 11, wherein the control unit determines an overcharged cell based on the individual voltages of the batteries, and the control unit is configured to select at least one sample switch corresponding to the overcharged cell from the plurality of sample switches and turn on/off the selected sample switch.

* * * * *